United States Patent [19]

Sakakibara et al.

[11] 4,454,718
[45] Jun. 19, 1984

[54] SAFETY CONTROL SYSTEM FOR A TURBOCHARGED ENGINE

[75] Inventors: Naoji Sakakibara, Chiryu; Isshi Nomura, Aichi, both of Japan

[73] Assignee: Aisin Seiki Kabushiki Kaisha, Kariya, Japan

[21] Appl. No.: 364,873

[22] Filed: Apr. 2, 1982

[30] Foreign Application Priority Data

Apr. 6, 1981 [JP] Japan .......................... 56-052118

[51] Int. Cl.³ .............................. F02B 37/12
[52] U.S. Cl. ........................ 60/600; 123/564
[58] Field of Search ............. 60/600, 601, 602, 603, 60/611; 123/564; 261/23 A

[56] References Cited

U.S. PATENT DOCUMENTS

| | | | |
|---|---|---|---|
| 3,464,202 | 9/1969 | Wagner | 60/611 |
| 3,596,642 | 8/1971 | Nakata | 261/23 A X |
| 4,075,849 | 2/1978 | Richardson | 60/602 |
| 4,130,608 | 12/1978 | Ota | 261/23 A |
| 4,150,545 | 4/1979 | Yamazaki | 60/611 |
| 4,246,752 | 1/1981 | Tryon | 60/611 X |

FOREIGN PATENT DOCUMENTS 717935 10/1931 France ......................... 123/564

*Primary Examiner*—Michael Koczo
*Attorney, Agent, or Firm*—Finnegan, Henderson, Farabow, Garrett & Dunner

[57] ABSTRACT

In a turbocharged, carbureted internal combustion engine, a safety control system including a vacuum motor responsive to vacuum created in one barrel of the carburetor to control fluid flow through a second barrel in the carburetor and a vacuum control valve responsive to turbocharger output fluid pressure for communicating air at atmospheric pressure to the vacuum motor to reduce fluid flow through the second barrel of the carburetor when the output fluid pressure exceeds a predetermined level.

6 Claims, 2 Drawing Figures

SAFETY CONTROL SYSTEM FOR A TURBOCHARGED ENGINE

BACKGROUND OF THE INVENTION

1. Field of the Invention

This invention relates to a safety control system for a turbocharged engine. In particular, the invention relates to a system for preventing damage to an internal combustion engine due to excess pressures generated by a turbocharger.

2. Description of the Prior Art

In a carbureted, turbocharged internal combustion engine, unsafe operating conditions may develop if the turbocharging system is not controlled. Such an unsafe condition occurs, for example, when the throttle is open to increase power output of the engine. This increased power output commensurately increases the exhaust gas which drives the turbine of the turbocharger thereby significantly increasing the supply of supercharged fuel air mixture to the combustion chamber. Under certain engine conditions, this supply of supercharged air will be greater than is required and may cause damage to both the engine and the turbocharger.

Conventionally, the problem created by a significant increase in volume of exhaust gas driving the turbocharger turbine has been alleviated by incorporating a waste gate valve in the exhaust manifold to provide means for bypassing the turbine. The waste gate valve relieves the volume and pressure of exhaust gas when they exceed a predetermined maximum. However, because conventional waste gate valves have failed, a more complete system for protecting the engine and turbocharger is necessary. The present invention provides an improved safety control system for a turbocharger in a carbureted internal combustion engine which controls the volume of exhaust gas acting on the turbine of the turbocharger and the volume of fuel-air mixture in the intake manifold, both in response to the output pressure of the turbocharger compressor. The present invention provides increased operating reliability over conventional safety systems which only incorporate an exhaust waste gate valve.

SUMMARY OF THE INVENTION

The objects and the advantages of the invention are set forth in part in the description which follows and in part will be obvious from the description, or may be learned by practice of the invention. The objects and advantages of the invention may be realized and attained by means of the instrumentalities and combinations particularly pointed out in the appended claims.

In accordance with the invention, as embodied and broadly described herein, an internal combustion engine including a carburetor having primary and secondary barrels, an intake manifold, an exhaust manifold, and a turbocharger having a turbine disposed in the exhaust manifold driving a compressor disposed in the intake manifold is improved with a safety control system comprising a vacuum motor means normally responsive to vacuum created in the primary barrel for mechanically controlling fluid flow through the secondary barrel, and vacuum control valve means responsive to turbocharger output fluid pressure for communicating air at atmospheric pressure to the vacuum motor means to reduce fluid flow through the secondary barrel when the output fluid pressure exceeds a predetermined value.

Preferably the safety control system also includes exhaust relief valve means responsive to turbocharger output fluid pressure for relieving exhaust gas pressure in the exhaust manifold upstream of the turbine when the turbocharger output fluid pressure exceeds a predetermined level.

BRIEF DESCRIPTION OF THE DRAWINGS

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENT

Figure 1:
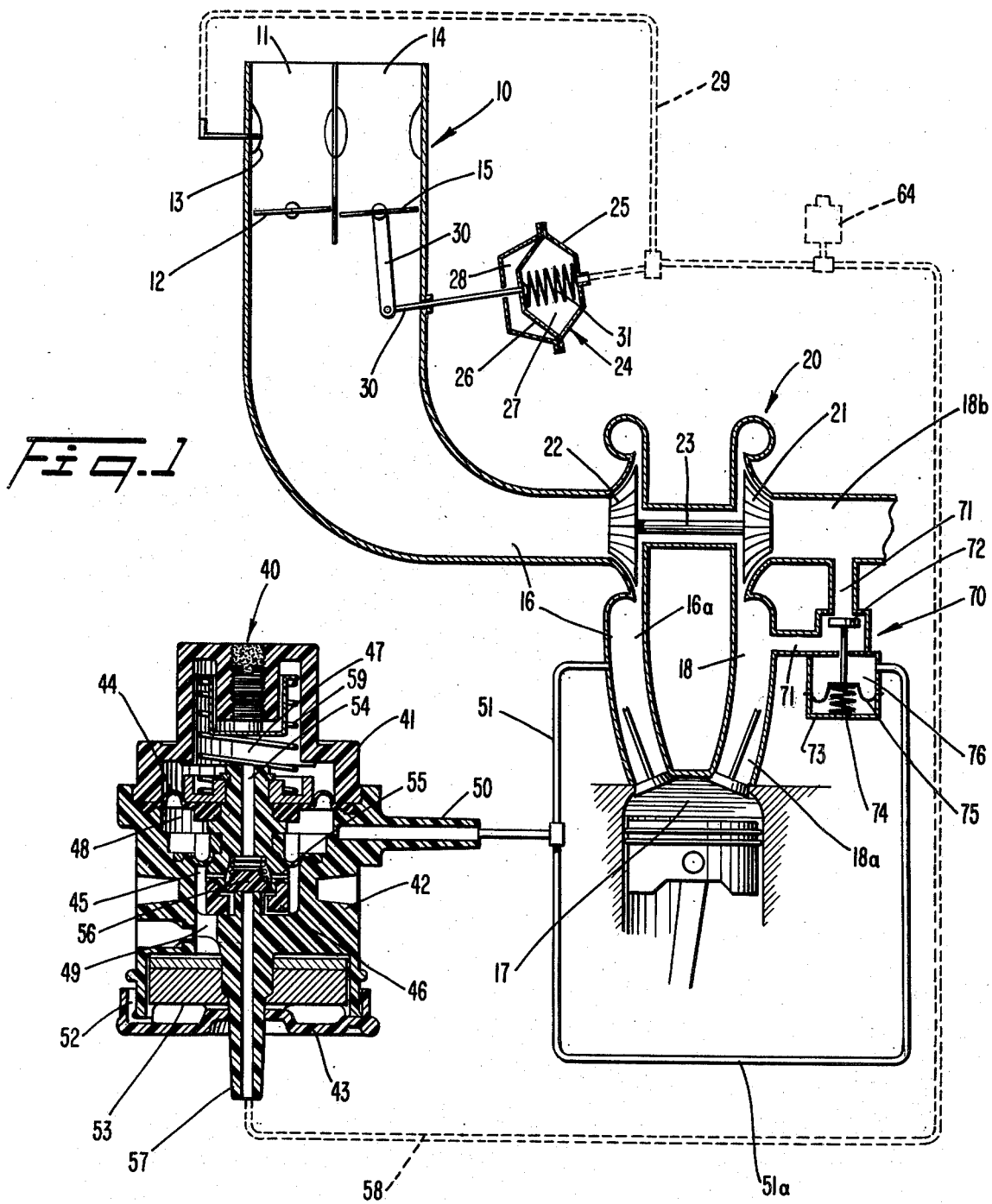
FIG. 1 is a schematic representation of one embodiment of the present invention.

Reference will now be made in detail to the present preferred embodiment of the invention, an example of which is illustrated in the accompanying drawing.

The present invention is an improvement to an internal combustion engine which includes a carburetor 10 having a primary barrel 11 with a primary throttle valve 12 and a venturi 13 and a secondary barrel 14 with a secondary throttle valve 15. The output of the carburetor 10 is conducted through an intake manifold 16 to a combustion chamber 17. Exhaust gas from the combustion chamber 17 is conducted through an exhaust manifold 18 to the atmosphere. The engine includes a turbocharger 20 having a turbine 21 disposed in the exhaust manifold 18 to be driven by the exhaust gas which in turn drives a compressor 22 disposed in the intake manifold 16 through a shaft 23.

In accordance with the invention, the internal combustion engine includes a safety control system comprising vacuum motor means normally responsive to vacuum created in the primary barrel for mechanically controlling fluid flow through the secondary barrel.

In the preferred embodiment depicted in FIG. 1, the vacuum motor means 24 comprises a housing 25, a diaphragm 26 dividing the interior of the housing 25 into a vacuum chamber 27 and an atmospheric chamber 28. The vacuum chamber 27 is in fluid communication by means of conduit 29 with the vacuum created in the venturi 13 of the primary barrel 11. As is conventional in a carburetor, the fluid flow through the venturi 13 depends upon the mechanical positioning of the primary throttle valve 12 which is mechanically connected to an accelerator pedal (not shown).

A diaphragm 26 of the vacuum motor means 24 is operatively connected by linkage 30 to the secondary throttle valve 15 in the secondary barrel 14. Spring 31 disposed in vacuum chamber 27 biases diaphragm 26 to close secondary throttle valve 15 by means of linkage 30.

In accordance with the invention, the safety control system comprises vacuum control valve means repsonsive to turbocharger output fluid pressure for communicating air at atmospheric pressure to the vacuum motor means to reduce fluid flow through the secondary barrel when the turbocharger output fluid pressure exceeds a predetermined value.

Preferably, as seen in FIG. 1, the vacuum control valve means 40 comprises a housing including first, second, and third bodies 41, 42, and 43. A diaphragm 44 secured between bodies 41 and 42 and member 45 secured to body 42 cooperate with movable element 46 to divide the interior of housing 40 into first, second, and third chambers 47, 48, 49, respectively. Second chamber 48 defined by diaphragm 44 and member 45 is in communication through first port 50 in body 42 through conduit 51 to the output fluid pressure of turbocharger 20 in intake manifold 16. Third chamber 49 is in communication through port 52 and filter 52 with the atmosphere. First chamber 47 communicates through cavity 54 and port 55 with third chamber 49. Normally closed valve 56 disposed in cavity 54 prevents communication of atmospheric pressure from first and third chambers 47, 49 through second port 57 to the vacuum chamber 27 of vacuum motor means 24 via conduit 58. Spring means, including spring 59 in first chamber 47 opposes expansion of second chamber 48 and biases valve 56 to its closed position preventing communication of atmospheric air to the vacuum motor means 24. Spring 59 determines the level of turbocharger output fluid pressure above which normally closed valve 56 opens permitting communication of atmospheric pressure from the second port 57 to the vacuum motor means 24.

Figure 2:
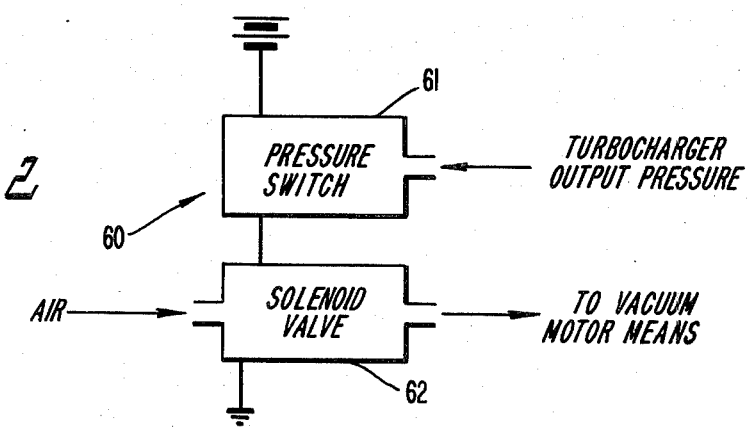
FIG. 2 is a schematic representation of another embodiment of the invention.

In an alternative embodiment depicted in FIG. 2, the vacuum control valve means 60 may comprise a conventional pressure switch 61 in fluid communication with turbocharger output fluid pressure and a solenoid valve 62 for selectively communicating atmospheric air to the vacuum motor means.

It may also be preferred to include in conduit 58 means for delaying communication of air at atmospheric pressure from vacuum control valve means 40 to vacuum motor means 24 to preclude sudden changes in fluid flow through secondary barrel 14. Such delaying means may be an orifice 64 which permits a portion of the air in conduit 58 to bleed off to the atmosphere.

Preferably, as herein embodied and depicted in FIG. 1, the safety control system also includes exhaust relief valve means 70 responsive to turbocharger output fluid pressure for relieving exhaust gas pressure in exhaust manifold 18 upstream of turbine 21 when the turbocharger output fluid pressure exceeds the predetermined level. The exhaust relief valve means 70 comprises an exhaust bypass conduit 71 providing fluid communication from the upstream portion 18a of exhaust manifold 18 to the downstream portion 18b of exhaust manifold 18. Valve 72 is disposed in the bypass conduit 71 for selectively preventing fluid flow through the bypass conduit 71. Housing 73 associated with valve 72 is provided in fluid communication through conduit 51a with the output fluid pressure of turbocharger 20 in the downstream portion 16a of the intake manifold 16. Spring means, including spring 74 and diaphragm 75, is disposed in housing 73. Valve 72 is connected with diaphragm 75 and spring 74 normally biases valve 72 to the closed position preventing fluid flow through the exhaust bypass conduit 71. Turbocharger output fluid pressure communicated to the chamber 76 defined by housing 73 opposes the bias of spring 74 by acting on diaphragm 75. Thus, spring 74 establishes a predetermined level of turbocharger output fluid pressure above which valve 72 is opened allowing exhaust gas to bypass turbine 21 of turbocharger 20.

In operation, main throttle valve 12 is actuated by depression of the accelerator pedal (not shown) to adjust the flow of fuel-air mixture through venturi 13 in primary barrel 11. The flow of fuel-air mixture through venturi 13 generates a vacuum in proportion to this flow which is transmitted by conduit 29 to vacuum chamber 27 of vacuum motor means 24. The vacuum in vacuum chamber 27 opposes the bias of spring 31 causing movement of diaphragm 26 to open secondary throttle valve 15 via linkages 30.

When the turbocharger outlet fluid pressure increases above a predetermined level due to high load conditions on the engine, for example, the turbocharger output fluid pressure is communicated by conduit 51a to chamber 76 in housing 73 of exhaust relief valve means 70. The increased pressure in chamber 76 acts on diaphragm 75 and opposes the bias of spring 74 thereby opening valve 72 to permit exhaust gas in exhaust manifold 18 to bypass turbine 21 of turbocharger 20. Thus, a part of the exhaust gas will be exhausted to the muffler side 18b and reduce the rotation of turbocharger 20 thus reducing the output fluid pressure of the turbocharger in portion 16a of the inlet manifold 16.

When the outlet fluid pressure of the turbocharger increases to an unusual level, due to failure of exhaust relief valve means 70, for example, turbocharger outlet fluid pressure is communicated by conduit 51 to second chamber 48 of vacuum control valve 40. The increased fluid pressure in second chamber 48 tends to expand chamber 48 in opposition to the bias of spring 59. Movement of element 46 which engages valve 56 to open second port 57 thereby communicating atmospheric pressure from first and third chambers 47, 49 through conduit 58 to vacuum 27 of vacuum motor means 24. The introduction of atmospheric pressure into vacuum chamber 27 counteracts the effect of vacuum introduced to chamber 27 from first barrel 11 and permits spring 31 to return diaphragm 26 to its original position thereby closing secondary throttle valve 15 through linkages 30. Closure of secondary throttle valve 15 reduces the flow of fuel-air mixture in the inlet manifold 16, limiting such flow to that passing through primary barrel 11. The reduction of the fuel-air mixture flow in inlet manifold 16 reduces engine output thereby decreasing the output fluid pressure of the turbocharger 20 and preventing damage to the engine.

Orifice 64 in line 58 may be included to dampen or modulate the flow of air pressure through line 58 from vacuum control valve means 40 to vacuum motor means 24. Use of orifice 64 will prevent sudden changes in engine speed.

It will be apparent to those skilled in the art that various modifications and variations could be made in the safety control system of the invention without departing from the scope or spirit of the invention.

What is claimed is:

1. In an internal combustion engine including a carburetor having primary and secondary barrels, an intake manifold, an exhaust manifold, and turbocharger having a turbine disposed in the exhaust manifold driving a compressor disposed in the intake manifold, a safety control system comprising:
    (a) exhaust relief valve means responsive to turbocharger output fluid pressure for relieving exhaust gas pressure in said exhaust manifold upstream of said turbine when said turbocharger output fluid pressure exceeds a predetermined level;
    (b) vacuum motor means normally responsive to vacuum created in said primary barrel for mechanically controlling fluid flow through said secondary barrel; and (c) vacuum control valve means responsive to turbocharger output fluid pressure for communicating air at atmospheric pressure to said vacuum motor means to reduce fluid flow through said secondary barrel when said turbocharger output fluid pressure exceeds a predetermined value which is higher than said predetermined level.

2. The safety control system as in claim 1 wherein said vacuum motor means comprises a housing, a diaphragm dividing the interior of said housing into a vacuum chamber in fluid communication with the vacuum created in said primary barrel and with said vacuum control valve means and an atmospheric chamber, linkage operatively connecting said diaphragm with a throttle valve in said secondary barrel, and a spring disposed in said vacuum chamber biasing said diaphragm to close said throttle valve.

3. The safety control system as in claim 1 wherein said vacuum control valve means comprises a housing, diaphragm means for forming within said housing first, second and third chambers, said second chamber being in fluid communication through a first port in said housing with said turbocharger outlet fluid pressure and said first and third chambers being in fluid communication with the atmosphere, a normally closed valve preventing communication of atmospheric pressure from said first and third chambers through a second port in said housing to said vacuum motor means, and spring means in said first chamber for opposing expansion of said second chamber and for biasing said valve to a closed position, said spring means determining the predetermined value of turbocharger outlet fluid pressure above which said normally closed valve opens communicating atmospheric pressure from said second port to said vacuum motor means.

4. The safety control system as in claim 1 wherein said vacuum control valve means comprises a normally closed solenoid operated valve for selectively communicating atmospheric pressure to said vacuum motor means and an electrical pressure switch responsive to turbocharger output fluid pressure for selectively opening said solenoid-operated valve when turbocharger output fluid pressure exceeds said predetermined value to communicate atmospheric pressure to said vacuum motor means.

5. The safety control system as in claim 3 or 4 also including means for delaying communication of air at atmospheric pressure from said vacuum control valve means to said vacuum motor means to preclude sudden changes in fluid flow through said secondary barrel.

6. The safety control system as in claim 1 wherein said exhaust relief valve means comprises an exhaust bypass conduit providing fluid communication from upstream said turbine to downstream said turbine, a valve for selectively preventing fluid flow through said exhaust bypass conduit, a housing associated with said valve in fluid communication with said turbocharger output fluid pressure, and spring means disposed in said housing for biasing said valve to a normally closed position preventing fluid flow through said exhaust bypass conduit, said spring means determining the predetermined level of said turbocharger outlet fluid pressure above which said valve is opened permitting fluid flow through said exhaust bypass conduit.

* * * * *